June 19, 1956 D. L. GETZ ET AL 2,751,108
FILLER CAP ASSEMBLY
Filed Oct. 8, 1952
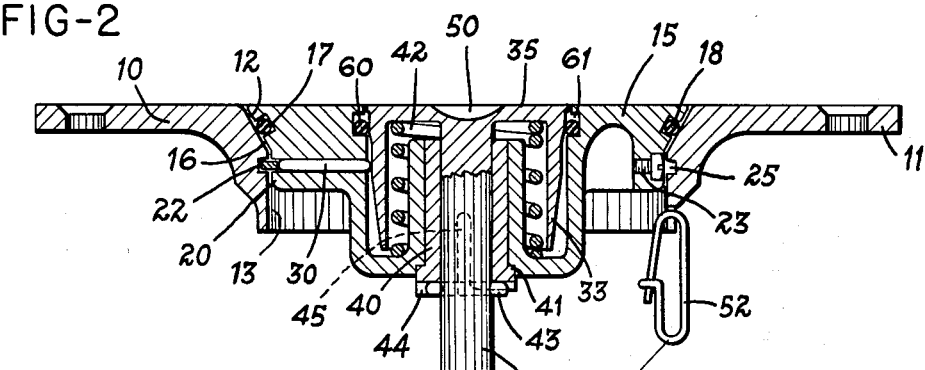
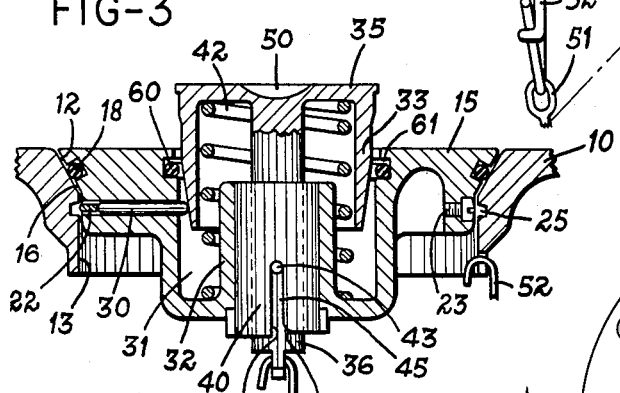
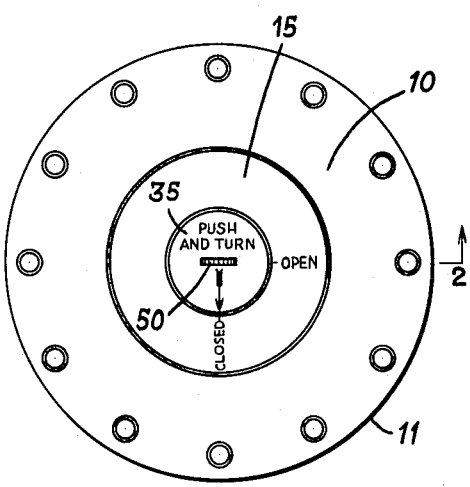
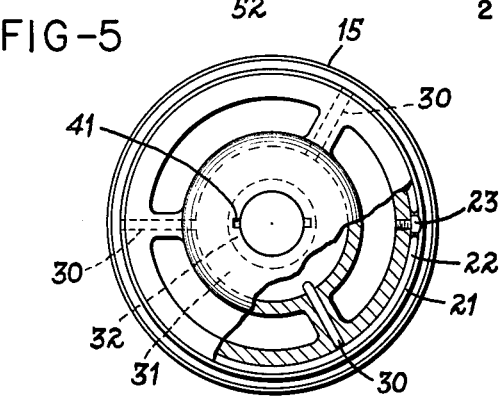
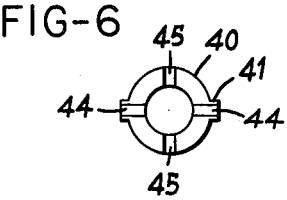
*INVENTOR.*
DELMOND L. GETZ &
BY GLEN E. RIDGWAY
*Marschal Biebel French Bugg*
ATTORNEYS

United States Patent Office 2,751,108
Patented June 19, 1956

2,751,108

FILLER CAP ASSEMBLY

Delmond L. Getz and Glen E. Ridgway, Springfield, Ohio, assignors, by mesne assignments, to Kelsey-Hayes Wheel Company, Detroit, Mich., a corporation of Delaware Application October 8, 1952, Serial No. 313,691

7 Claims. (Cl. 220—55)

This invention relates to a filler cap assembly, and it has particular relation to filler cap assemblies adapted for use with fuel tanks and other containers wherein the interior of the container is under pressure, such for example in the case of fuel tanks for airplanes.

One of the principal objects of the invention is to provide a filler cap assembly for the inlet of a container which will seal effectively at both high and low pressure conditions within the container, which is of lightweight but strong construction suitable for use with aircraft fuel tanks, and which will present a substantially flush surface in closed position and will therefore be particularly adapted for mounting on the external skin or surface of an airplane.

Another object of the invention is to provide a filler cap assembly in which the inner closure member and the outer adapter member are positively locked when in closed position by means of generally radially movable interlocking parts which are so constructed and arranged in the assembly as to establish locking action around substantially the entire circumference of the closure member.

It is also an object of the invention to provide a filler cap assembly which includes positively interlocking parts as outlined above and which also includes sealing gaskets located externally of the locking parts to protect the same against moisture and possible freezing when the assembly is subjected to low temperatures.

Other objects and advantages of the present invention will be apparent from the following description, the accompanying drawings and the appended claims.

In the drawings—

Fig. 1 is a top view of the filler cap assembly constructed in accordance with the invention and shown in closed position;

Fig. 2 is a section on the line 2—2 of Fig. 1 and on a larger scale;

Fig. 3 is a fragmentary section similar to Fig. 2 but showing the assembly in unlocked position;

Fig. 4 is a detail view in side elevation of the main cap or closure member of the assembly with the sealing ring and lock ring removed;

Fig. 5 is an elevational view showing the inner end of the cap unit and with part of the cap broken away in section; and Fig. 6 is a detail view of the inner end of the bushing member of the cap assembly.

Referring to the drawings, which illustrate a preferred embodiment of the invention, the adapter 10 includes a peripheral flange portion 11 adapted to be riveted or otherwise secured to a container such as a fuel tank of an aircraft or other vehicle. The adapter includes a tapered annular rim 12 surrounding the filling opening formed by the inner cylindrical portion 13. The cap 15 forms the main closure of the assembly, and it includes a tapered surface 16 complementary with the rim 12, and this surface portion 16 is grooved at 17 to receive and retain a gasket such as an O-ring 18 adapted for sealing engagement with the rim surface 12.

The cap 15 includes a cylindrical portion 20 adapted to be freely received within the cylindrical portion 13 of the adapter. This portion 20 of the cap is provided with a circumferential groove 21 which receives a split ring 22 of resilient metal, and this ring is held against rotational movement in the groove by a screw 23 having its head substantially flush with the cylindrical surface 20. The ring 22 is normally of an outer diameter not materially greater and preferably slightly less than that of the cylindrical portion 20 of the cap, so that the cap with the ring in place thereon can be readily inserted within the portion 13 of the adapter.

The ring 22 can be expanded radially in the groove 21 to a diameter greater than that of the adapter portion 13, and a circumferential groove 25 is provided in the surface 13 to serve as a keeper for the ring and to cooperate therewith to form a positive lock between the cap and adapter, the ring being of sufficient radial dimensions as shown for simultaneous engagement in the grooves 21 and 25. Controlled expansion of ring 22 for this locking action is provided by a plurality of pins 30 mounted for radial movement in the cap 15 and having their inner ends projecting into an annular recess 31 in the cap formed by its outer portion and a tubular inner portion 32. Movement of the pins 30 is in turn controlled by a tapered thimble-shaped cam portion 33 of a retainer 35 mounted for axial and rotational movement in the recess 31 in the cap.

The retainer 35 includes a stud portion 36 mounted in a bushing 40 force fitted within the tubular portion 32 of the cap and keyed therewith at 41. A spring 42 normally urges the retainer upwards to a raised position above the level of the cap. A pin 43 extends through the stud portion 36 of the retainer, and the bushing 40 is formed with grooves 44 and slots 45 in its lower end for receiving the ends of pin 43. The grooves 44 and 45 are shown in Fig. 6 as spaced 90° from each other, although this spacing could be greater or less if desired, and they are also of materially different depths so proportioned that when the ends of pins 43 are received in groove 44, the outer end of the retainer is substantially flush with the corresponding surface of the cap. Similarly when the retainer is rotated sufficiently to shift pin 43 from grooves 44 to slots 45, the ends of pin 43 will ride up in slots 45, and the retainer will then project above the cap as shown in Fig. 3.

The cam portion 33 of retainer 35 is tapered as shown to drive pins 30 radially outwardly as the retainer moves inwardly into the cap. These parts are so proportioned that when the retainer is in its raised position, the pins are free to move inwardly under the natural contracting force of ring 22 to permit the latter to withdraw out of groove 25. However, when the retainer is moved to its innermost position, the pins 30 will be cammed outwardly and thus force the ring to expand into locked engagement with the keeper groove 25 to provide a locking action extending around substantially the entire circumference of the cap.

Fig. 2 shows the parts in their relative positions when the device is closed. In order to open the cap, it is merely necessary to apply a slight downward force and then to rotate the retainer through the necessary angular distance to shift pin 43 from grooves 44 into slots 45, as by insertion of a coin or screw driver in the slot 50 in its outer end. The spring 42 will raise the retainer to the position shown in Fig. 1, which will simultaneously permit contraction of the ring 22 out of its locked position in groove 45, and the entire cap can then be lifted out of the adapter, the only connection between these parts then being provided by the safety chain 51 and its attaching pins 52.

To relock the cap, it is reinserted in the adapter, pressed down sufficiently to seal the ring 18 against rim 12 and to bring the ring 22 into line with groove 25, and then the retainer is pushed down into the cap and again rotated back of its original position. This action is aided by the formation of the slots 44 as shown in Fig. 3 which provides a shoulder 55 at one side of each slot opposite a rounded edge 56 to serve as a stop guiding pin 43 into slots 44. As the retainer is pushed down, it will cam the pins and lock rings out of its locking position, and the subsequent rotation of the retainer moves the ends of pin 43 into their locked relation with grooves 44.

With the assembly constructed and operating as described, highly effective sealing is obtained at the junction of gasket 18 with the rim surface 12 over a wide range of internal tank pressures, including both low and high pressures, namely pressures as high as of the order of 100 pounds per square inch. Furthermore, this seal will remain tight over a wide range of temperature and moisture conditions since even if the gasket should swell, it will not interfere with opening or closing of the cap, and the gasket ring 18 also provides an effective seal against access of moisture from without to the locking ring 22. Similar protection against moisture for the locking parts is provided by an additional O-ring 60 or other gasket which is mounted within a retaining groove 61 in the cap adjacent the upper end of recess 31 and is adapted to seal against the wall of retainer 35 just below its upper end.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A filler cap assembly for the inlet of a container to retain positive pressure on the contents thereof, comprising an adapter for said container including an annular rim defining an inlet opening, a closure adapted to be received within said opening, means on said closure adapted for sealing engagement with said rim, said closure having a circumferential groove therein located inwardly of said sealing means, a split ring of resilient metal carried in said groove, and normally of lesser diameter than said opening for fitting therewithin, said adapter having an inner peripheral groove within said opening forming a keeper for said ring, a plurality of pins mounted for generally radial movement within said closure inwardly of and in engagement with said ring, and a cam carried by said closure for movable engagement with the radially inner ends of said pins for pressing said pins outwardly to expand said ring into engagement with said peripheral groove around substantially the entire circumference of said opening while retaining the radially inner portion of said ring within said circumferential groove to lock said closure within said adapter.

2. A filler cap assembly for the inlet of a container to retain positive pressure on the contents thereof, comprising an adapter for said container including an annular rim defining an inlet opening, a closure adapted to be received within said opening, means on said closure adapted for sealing engagement with said rim, said closure having a circumferential groove therein located inwardly of said sealing means, a split ring of resilient metal carried in said groove and normally of lesser diameter than said opening for fitting therewithin, said adapter having an inner peripheral groove within said opening forming a keeper for said ring, a tapered cam mounted for axial movement within said closure, means operatively connecting said cam with the inner periphery of said ring to effect radial expansion of said ring into engagement with said peripheral groove in response to movement of said cam to an inward position within said closure while retaining the radially inner portion of said ring within said circumferential groove to lock said closure within said adapter, means biasing said cam to an outer position with respect to said closure for unlocking said ring, and cooperating means on said closure and said cam for retaining said cam in said inward position within said closure to maintain said ring locked in said groove.

3. A filler cap assembly for the inlet of a container to retain positive pressure on the contents thereof, comprising an adapter for said container including an annular rim defining an inlet opening, a closure adapted to be received within said opening, means on said closure adapted for sealing engagement with said rim, said closure having a circumferential groove therein located inwardly of said sealing means, a split ring of resilient metal carried in said groove and normally of lesser diameter than said opening for fitting therewithin, said adapter having an inner peripheral groove within said opening forming a keeper for said ring, a tapered cam mounted for axial movement within said closure, means operatively connecting said cam with the inner periphery of said ring to effect radial expansion of said ring into engagement with said groove in response to movement of said cam in an inward position within said closure while retaining the radially inner portion of said ring within said circumferential groove to lock said closure within said adapter, means biasing said cam to an outer position with respect to said closure for unlocking said ring, cooperating means on said closure and said cam responsive to relative rotation of said closure and said cam in said inward position of said cam for retaining said cam in said inward position, and gasket means carried by said closure for engagement with said cam outwardly of said locking means for sealing said locking means against access of moisture in the closed and locked position of said assembly.

4. A filler cap assembly for the inlet of a container to retain positive pressure on the contents thereof, comprising an adapter for said container defining an inlet opening and including a tapered rim surrounding said opening, a closure adapted to be received within said opening and including a frustoconical tapered portion complementary to said rim, gasket means carried by said frustoconical portion of said closure for sealing engagement with said tapered rim, a resilient split ring carried by and substantially surrounding said closure and normally of lesser diameter than said opening for fitting therewithin, said adapter having an inner peripheral groove within said opening forming a keeper for said ring, a tapered cam mounted for axial movement within said closure, means operatively connecting said cam with the inner periphery of said ring to effect radial expansion of said ring into locking engagement with said groove in response to movement of said cam in an inward position within said closure, means biasing said cam to an outer position with respect to said closure for unlocking said ring, cooperating means on said closure and said cam responsive to relative rotation of said closure and said cam in said inward position of said cam for retaining said cam in said inward position, and gasket means carried by said closure for engagement with said cam outwardly of said locking means for sealing said locking means against access of moisture in the closed and locked position of said assembly.

5. A filler cap assembly for the inlet of a container to retain positive pressure on the contents thereof, comprising an adapter for said container defining an inlet opening and including a tapered rim surrounding said opening, a closure adapted to be received within said opening and including a tapered portion complementary to said rim, a gasket carried by said tapered portion of said closure for sealing engagement with said tapered rim, said closure having a circumferential groove therein located inwardly of said gasket, a split ring of resilient metal carried in said groove and normally of lesser diameter than said opening for fitting therewithin, said adapted having an inner peripheral groove located inwardly of said tapered rim and forming a keeper for said ring, a plurality of pins mounted for generally radial movement within said closure and in engagement with the inner periphery of said ring, a cam movably mounted within said closure in engagement with the inner ends of said pins for moving said pins in the direction to effect radial expansion of said ring into engagement within said peripheral groove while retaining the radially inner portion of said ring within said circumferential groove to lock said closure within said adapter with said gasket sealing said ring and said grooves against access by moisture from without, means accessible from outside said assembly for operating said cam, and gasket means effective between said cam and said closure for sealing said pins from without.

6. A filler cap assembly for the inlet of a container to retain positive pressure on the contents thereof, comprising an adapter for said container defining an inlet opening and including a tapered rim surrounding said opening, a closure adapted to be received within said opening and including a tapered portion complementary to said rim, a gasket carried by said tapered closure portion for sealing engagement with said tapered rim, said closure having a circumferential groove therein located inwardly of said gasket, a split ring of resilient metal carried in said groove and normally of lesser diameter than said opening for fitting therewithin, said adapter having an inner peripheral groove located inwardly of said tapered rim and forming a keeper for said ring, a plurality of pins mounted for generally radial movement within said closure and in engagement with the inner periphery of said ring, a cam mounted for axial movement within said closure, said cam having a tapered outer surface engaging the inner ends of said pins to move said pins outwardly in response to movement of said cam to an inward position and thereby to effect radial expansion of said ring into engagement within said peripheral groove while retaining the radially inner portion of said ring within said circumferential groove to lock said closure within said adapter with said gasket sealing said ring and said grooves against access of moisture from without, means biasing said cam to an outer position with respect to said closure for unlocking said ring, cooperating means on said closure and said cam responsive to relative rotation of said closure and said cam in said inward position of said cam for retaining said cam in said inward position, and gasket means carried by said closure for engagement with said cam outwardly of said pins for sealing said pins against access by moisture in the closed and locked position of said assembly.

7. A filler cap assembly for the inlet of a container to retain positive pressure on the contents thereof, comprising an adapter for said container including an annular rim defining an inlet opening, a closure adapted to be received within said opening and having a surface thereon adapted to mate with said rim, a gasket carried by said mating surface of said closure for sealing engagement with said rim, said closure having a circumferential groove therein located inwardly of said gasket, a split ring of resilient metal carried in said groove and normally of lesser diameter than said opening for fitting therewithin, said adapter having a peripheral groove within said opening forming a keeper for said ring, said peripheral groove and said split ring being proportioned with respect to said closure and said adapter to retain said closure with its outer surface within the outer plane of said adapter, means carried by said closure operable to expand said split ring into simultaneous locking engagement with both of said grooves around substantially the entire circumference of said opening, an operating member for said expanding means mounted for axial movement within said closure, means defining an outer position for said operating member wherein said expanding means are released and an inner position for said operating member causing operation of said expanding means, means biasing said operating member to said outer position, and cooperating means on said closure and said operating member responsive to relative rotation of said closure and said operating member in said inner position effecting said locking engagement of said ring in said grooves.

References Cited in the file of this patent

UNITED STATES PATENTS

| | | |
|---|---|---|
| 31,856 | Wilson | Mar. 26, 1861 |
| 217,287 | Holder | July 8, 1879 |
| 299,676 | Poland | June 3, 1884 |
| 1,560,489 | Yager | Nov. 3, 1925 |
| 1,847,117 | Lantero | Mar. 1, 1932 |
| 2,108,145 | Short | Feb. 15, 1938 |
| 2,390,445 | Mercier | Dec. 4, 1945 |
| 2,401,856 | Brock | June 11, 1946 |

FOREIGN PATENTS

| | | |
|---|---|---|
| 4,711 | Great Britain | 1896 |